(12) United States Patent
Ceglarek et al.

(10) Patent No.: US 11,584,262 B2
(45) Date of Patent: Feb. 21, 2023

(54) ELECTROPNEUMATIC SWITCH ARRANGEMENT

(71) Applicant: Faurecia Autositze GmbH, Stadthagen (DE)

(72) Inventors: Piotr Ceglarek, Katowice (PL); Rafal Strok, Walbrzych (PL); Michal Kosko, Osiecznica (PL)

(73) Assignee: Faurecia Autositze GmbH, Stadthagen (DE)

( * ) Notice: Subject to any disclaimer, the term of this patent is extended or adjusted under 35 U.S.C. 154(b) by 389 days.

(21) Appl. No.: 16/896,559

(22) Filed: Jun. 9, 2020

(65) Prior Publication Data

US 2020/0398701 A1 Dec. 24, 2020

(30) Foreign Application Priority Data

Jun. 24, 2019 (DE) .......................... 102019116967.4

(51) Int. Cl.
| | |
|---|---|
| *B60N 2/90* | (2018.01) |
| *B60N 2/02* | (2006.01) |
| *F16K 27/02* | (2006.01) |
| *F16K 15/20* | (2006.01) |
| *F16K 11/10* | (2006.01) |

(52) U.S. Cl.
CPC ........... *B60N 2/0296* (2013.01); *B60N 2/914* (2018.02); *B60N 2/919* (2018.02); *B60N 2002/924* (2018.02); *F16K 11/10* (2013.01); *F16K 15/20* (2013.01); *F16K 27/0281* (2013.01)

(58) Field of Classification Search
CPC ........ B60N 2/914; B60N 2/919; B60N 2/665; F16K 27/0281; F16K 11/10; F16K 15/20
See application file for complete search history.

(56) References Cited

U.S. PATENT DOCUMENTS 10,471,868 B2 * 11/2019 Wheeler .............. B60N 2/0228
2018/0201168 A1 7/2018 Wheeler

FOREIGN PATENT DOCUMENTS

| DE | 10046141 A1 | 4/2001 |
|---|---|---|
| DE | 202017100623 U1 | 4/2017 |

* cited by examiner

*Primary Examiner* — Syed A Islam
(74) *Attorney, Agent, or Firm* — Laurence P. Colton; Smith Tempel Blaha LLC

(57) ABSTRACT

An electropneumatic switch arrangement having an actuation device plurality of pneumatic outlets for connection to fluid-fillable devices, and a pneumatic supply connection for connection to a pressure source, the actuation device being connected to a sealing device, the actuation device being designed in such a way that, when it is actuated, it opens a predefined flow path between the supply connection and at least one of the outlets and, in doing so, closes a current path for actuating the pressure source, characterized in that the sealing device is mechanically coupled to the actuation device in such a way that at least a part of the sealing device is moved, in particular displaced, by the actuation device when this is actuated, thereby opening a flow path between the supply connection and at least one of the outlets.

15 Claims, 5 Drawing Sheets

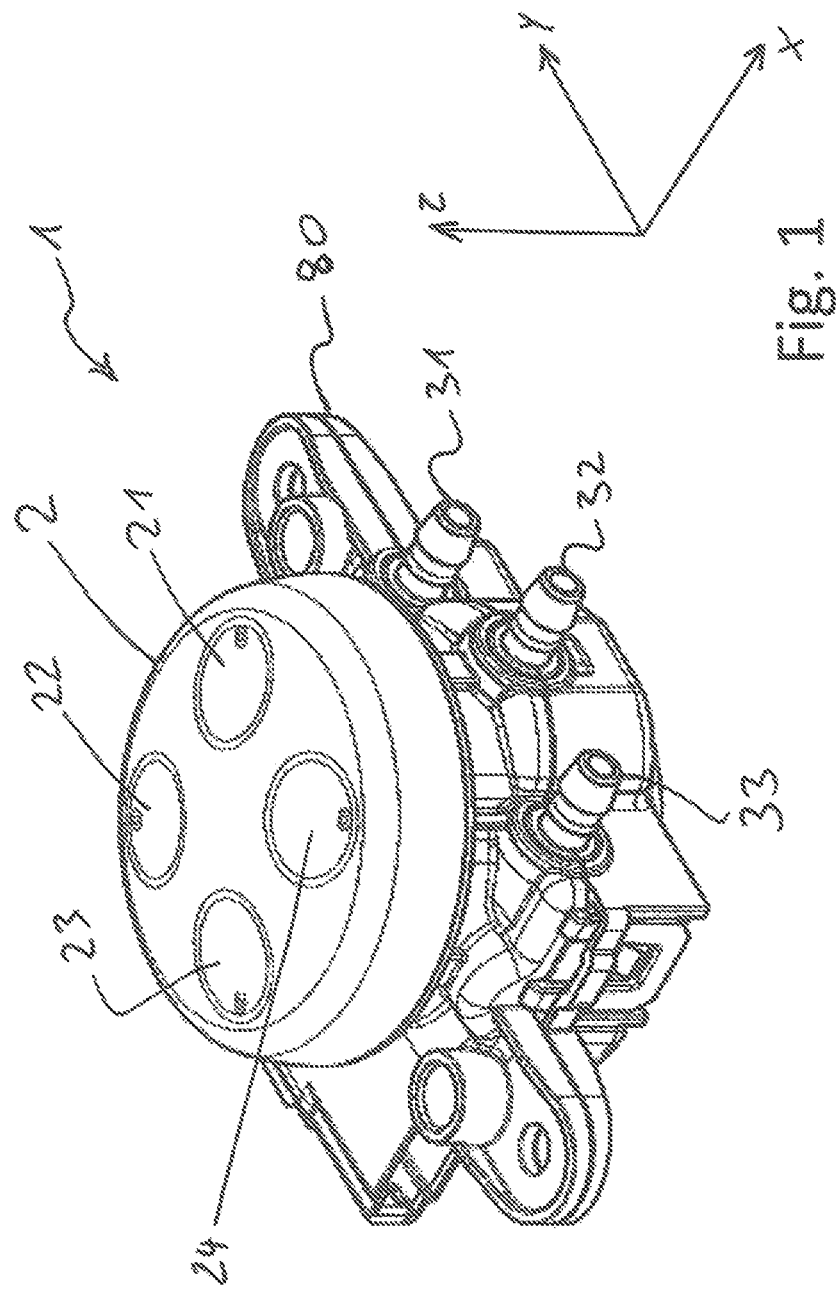

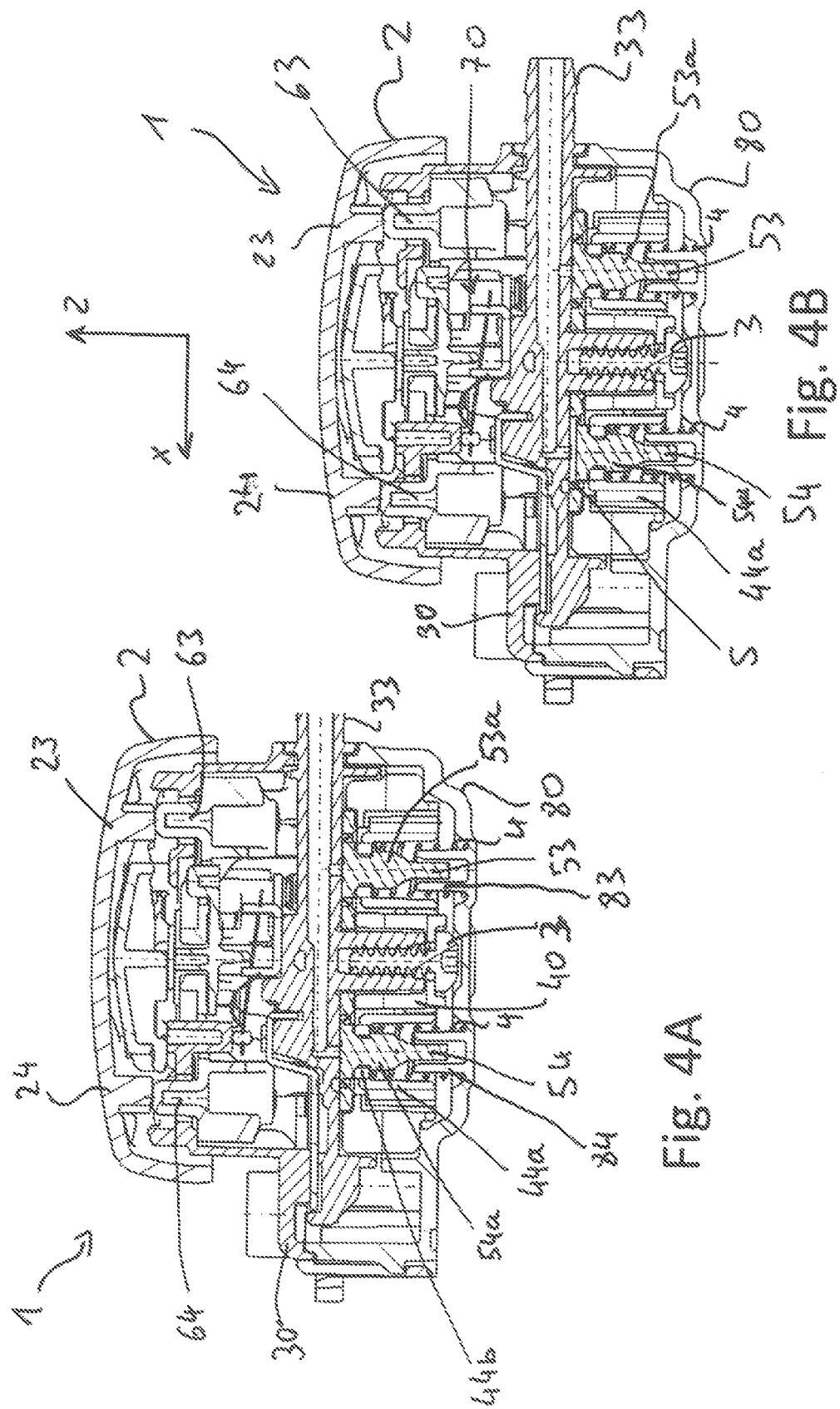

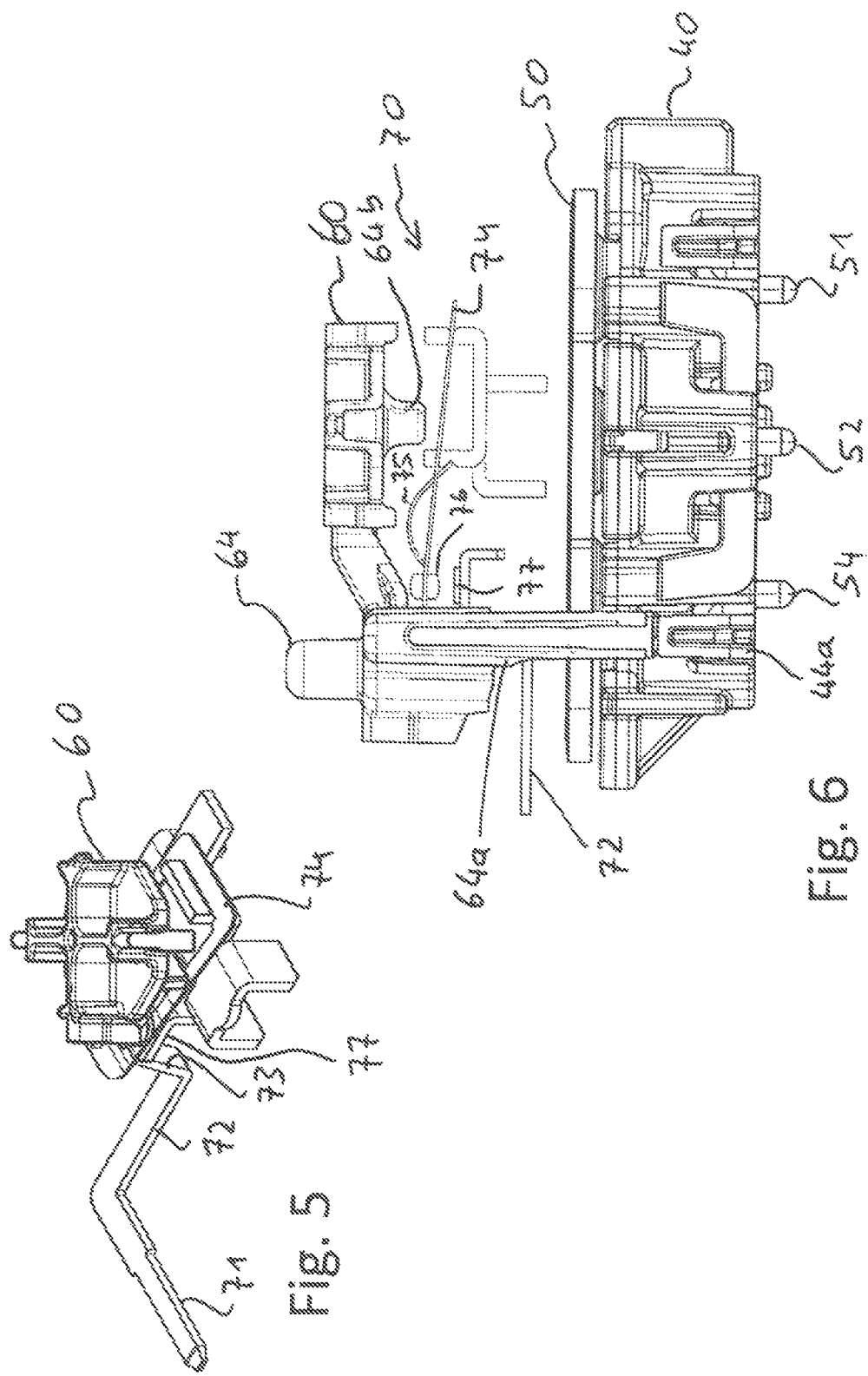

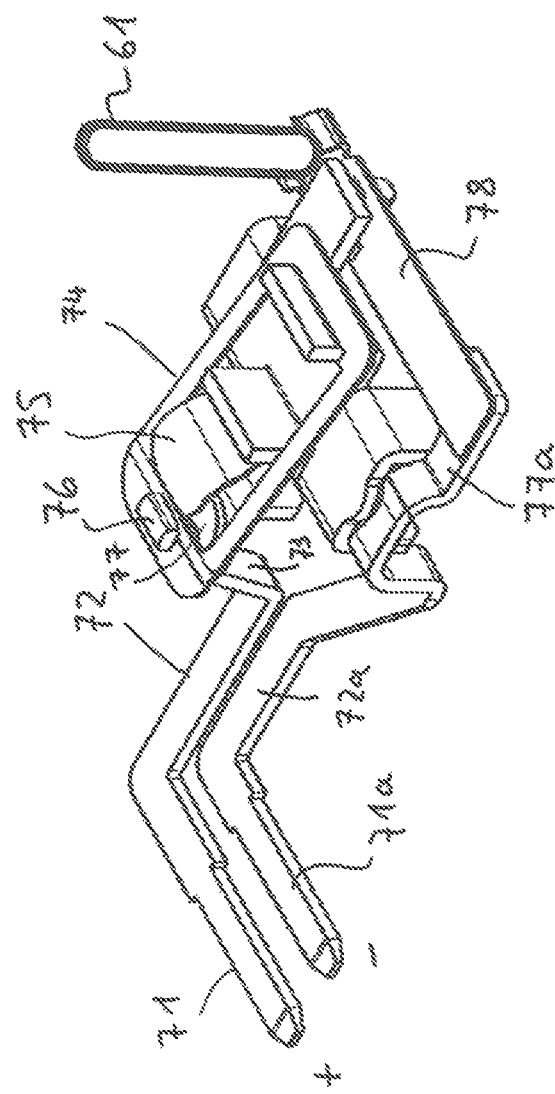

ELECTROPNEUMATIC SWITCH ARRANGEMENT

CROSS REFERENCE TO RELATED APPLICATIONS

This patent application claims priority on and the benefit of German Patent Application Number 102019116967.4 having a filing date of 24 Jun. 2020.

BACKGROUND OF THE INVENTION

Technical Field

The invention relates to an electropneumatic switch arrangement comprising an actuation device, a plurality of pneumatic outlets for connection to fluid-fillable devices, and a pneumatic supply connection for connection to a pressure source, the actuation device being connected to a sealing device, the actuation device being designed in such a way that, when it is actuated, it opens a predefined flow path between the supply connection and at least one of the outlets and, in doing so, closes a current path for actuating the pressure source.

Prior Art

Generic switch arrangements are known from DE 20 2017 100 623 U1 or US 2018 201 168 A1, for example.

Corresponding switch arrangements are used for example in motor vehicle seats to ensure that fluid-fillable bladders housed in the seat are filled or emptied. On the one hand, such bladders are used for seat adjustment, especially in the lumbar region, and, on the other hand, side bolsters or similar components may of course also be individually adjusted.

In most cases, switches are used for this purpose, by means of which a pump, which is intended to pump a fluid—especially air—into a fluid-fillable bladder, is able to be switched on and off. In this case, not only is the pump electrically switched, but also the flow path is opened at the same time, which guides the compressed air coming from the pump to the bladder or evacuates air from the bladder. Toggle switches in the form of buttons or the like are often used for this purpose, wherein the filling/evacuation continues as long as the user keeps the button pressed.

One problem is that, in existing designs, a piston or ram is usually pressed under spring preload against a sealing seat so that no air can escape from the bladders in the unactuated state. The piston or plunger must therefore be manually released from the sealing engagement with a seal. To do this, each piston or plunger requires its own sealing element to prevent air from escaping from the system.

DE 100 46 141 A1 discloses an improvement in which the seals are made in one piece, which reduces the number of components. In this case, spring-assisted plungers press the seal onto the inlets or outlets of the bladders. The valves are opened by means of a rocker switch mounted in the centre, whereby the corresponding plunger is tilted sideways, radially outwards, thus lifting the seal so that a connection is established between the inflow or the outlet. Electric switches may be situated within the movement range of the plungers, the contact of which switches is closed by the tilted plungers, thus operating a pump, for example.

In addition, such known switches have the disadvantage that often it is not clear to the user when the switch is actually being actively operated. This is mainly due to the fact that the user usually cannot see the switch himself when he actuates it, since it is usually fitted on the side of a motor vehicle seat.

BRIEF SUMMARY OF THE INVENTION

The object of the present invention is therefore to create a switch arrangement of the kind mentioned above, with which the described inadequacies are overcome.

This object is achieved by a switch arrangement having an actuation device, a plurality of pneumatic outlets for connection to fluid-fillable devices, and a pneumatic supply connection for connection to a pressure source, the actuation device being connected to a sealing device, the actuation device being designed in such a way that, when it is actuated, it opens a predefined flow path between the supply connection and at least one of the outlets and, in doing so, closes a current path for actuating the pressure source, characterized in that the sealing device is mechanically coupled to the actuation device in such a way that at least a part of the sealing device is moved, in particular displaced, by the actuation device when this is actuated, thereby opening a flow path between the supply connection and at least one of the outlets, and a motor vehicle interior arrangement, in particular a motor vehicle seat, having a plurality of fluid-fillable bladders and a switch arrangement, the switch arrangement being connected to the fluid-fillable bladders via fluid lines. Advantageous embodiments can be found in the dependent claims.

The electropneumatic switch arrangement according to the invention comprises an actuation device, a plurality of pneumatic outlets for connection to fluid-fillable devices, in particular bladders, and a pneumatic supply connection for connection to a pressure source, in particular a pump. The actuation device is coupled here to a sealing device. The actuation device is designed in such a way that, when it is actuated, it opens a predefined flow path between the supply connection and at least one of the outlets and in so doing closes a current path for actuating the pressure source. In accordance with the invention it is now provided that the sealing device is mechanically coupled to the actuation device in such a way that at least a part of the sealing device is moved, in particular displaced, by the actuation device when this is actuated. A flow path between the supply connection and at least one of the outlets is thereby released. In accordance with the invention it is provided that this comprises a first component, which comprises the supply connection and the outlets, and a second component connected to the first component. The sealing device is arranged here between the first component and the second component. The second component in this case has a plurality of receptacles, and projections are provided on the sealing device, which dip into the corresponding receptacles.

Thus, in accordance with the invention and in contrast to known solutions, no closure element is lifted from a seal when the switch arrangement is actuated, and instead the sealing device itself is moved, more specifically at the point at which the actuation has occurred. This enables the sealing device to be provided as a one-piece or one-part element. This spares a whole series of components. According to a particularly preferred embodiment, the sealing device is formed from an elastomer material. Of course, other common sealing materials may also be used.

A preferred embodiment of the switch arrangement according to the invention provides that the sealing device comprises a plurality of projections with coupling portions which are coupled to actuation portions coupled to the actuation device. Each of the projections serves, inter alia, for coupling with the actuation device and for correct guidance of the sealing device within the switch arrangement. The actuation portions are designed here in such a way that at least one of them is/are displaced, in particular pulled, into an open position which releases at least one flow path when the actuation device is actuated. By shifting into the open position, the sealing effect by at least one of the projections is temporarily cancelled and a fluid medium may flow past the projection accordingly.

Preferably, the projections are preloaded so that they return to their closed position again as soon as the actuation device is no longer actuated. Unintentional escape of fluid media, especially air, may thus be prevented. Preferably, a preloading device, in particular a compression spring, is provided for this purpose, which preloads the sealing device into a closed position, in which the flow path is blocked. Each projection preferably has its own preloading device, in particular a compression spring.

In addition to the operational safety ensured by auxiliary means such as preloading devices and one-piece sealing devices, the switch arrangement according to the invention may also be provided accordingly with a support for the operator, indicating whether the switch is actually operated. This indication may basically be a haptic signal, e.g. vibration, or an optical signal, e.g. illumination of a lamp. However, it is preferable for such a signal to be acoustic, since—as mentioned at the outset—the switch is usually situated on the vehicle seat in an area not directly visible to the driver. For this purpose, it may be provided in particular that the switch arrangement also comprises an acoustic signalling device, which is designed to signal the actuation of the actuation device acoustically. Such an acoustic signalling device may, for example, comprise a curved, in particular metallic, leaf spring element which, when the actuation device is actuated, is pressed through so that its curvature is inverted. This "clicker principle" means that the curvature of the leaf spring element changes from convex to concave, with the concave, generally metastable state being abruptly assumed after deformation of the leaf spring element, thereby producing a clicking sound.

Preferably, the actuation device comprises a plurality of actuation elements, which are each associated with a flow path and/or an electrical contact element. Thus, a whole series of different switching operations may be realised with a single switch arrangement. In accordance with an advantageous embodiment, the actuation elements are arranged on a tilt element mounted tiltably on the switch arrangement. This means that there is no need for a number of separate components for the actuation elements, and instead a single component is sufficient for all actuation elements.

It may be provided here that the tilting element is preloaded into a non-actuation position, in which the flow in the switch arrangement is interrupted and/or no flow path is open. This may be achieved by means of the preloading device described above. In this case, the switch arrangement functions similarly to a push button.

According to a further preferred embodiment of the switch arrangement according to the invention, it may be provided that electrical contact is made in a central region of the actuation device when a switch of the switch arrangement is pressed. The actuation device is constructed in such a way that the central region is always also moved when a switch is pressed, so that electrical contact is made solely by pressing the switch. An arrangement of the electrical contact in the central region allows a more compact design, because the electrical contact does not have to be arranged radially outside the valves.

In a particularly preferred embodiment, the contact is made at a unit. This means that a unit is designed to be actuated no matter which flow path is opened. Concentration to a single unit allows a more compact design and reduces the number of components. By attaching the actuation device to the first component, a very compact switch arrangement may now be made available, which requires a minimum number of necessary components.

The invention also relates to a motor vehicle interior arrangement, in particular a motor vehicle seat, in which the switch arrangement described above is used. The motor vehicle interior arrangement comprises a plurality of fluid-fillable bladders and the switch arrangement described above, the switch arrangement being connected to the fluid-fillable bladders via fluid lines. Air is the preferred fluid.

According to one embodiment, the pressure source may be a pump electrically and fluidically connected to the switch arrangement, at least one of the actuation elements being coupled in particular to an electrical contact element and being designed to change the polarity of the pump in order to empty one or more of the bladders.

BRIEF DESCRIPTION OF THE DRAWINGS

The invention will be explained hereinafter with reference to FIGS. 1 to 7.

FIG. 1 shows a perspective view of an exemplary embodiment of a switch arrangement according to the invention;

FIG. 4A and FIG. 4B show a sectional view through the switch arrangement according to the invention shown in FIG. 1 in the unactuated state (FIG. 4A) and in an actuated state (FIG. 4B);

FIG. 5 shows a perspective view of part of the actuation device according to the invention;

FIG. 6 shows a component of the switch arrangement according to the invention and the detail shown in FIG. 5 in a view from the side; and FIG. 7 shows a view similar to FIG. 5, in which an actuation element for actuation of an evacuation function is shown.

DETAILED DESCRIPTION OF PREFERRED EMBODIMENTS

An exemplary embodiment of a switch arrangement 1 according to the invention is shown by way of example in FIG. 1. The individual components are accommodated in a housing 80. On the one hand, a cover 2 can be seen, which is coupled to the actuation device (not shown in this figure). The reference signs 21-24 denote individual switch positions or switches which may be selected by an operator. There are also three outlets 31, 32 and 33 visible (although there may also be more or fewer outlets), which are arranged in a plane x-y in the embodiment shown here. These outlets may be connected via a line (not shown) to fluid-fillable bladders (not shown), for example. Depending on the switch position, the switch arrangement 1 according to the invention may for example thus open a flow path through one of the outlets 31, 32 or 33 or even through a plurality of the outlets 31, 32 or 33. The switch arrangement 1 may be connected to a pressure source, for example a pump. Since the switch arrangement is an electropneumatic switch here, when the switch arrangement 1 is actuated, in addition to opening a flow path, an electric circuit is also closed at the same time, which actuates the pressure source. Thus, the pressure source does not have to run permanently under load, but is switched on only when it is actually required.

Figure 3:
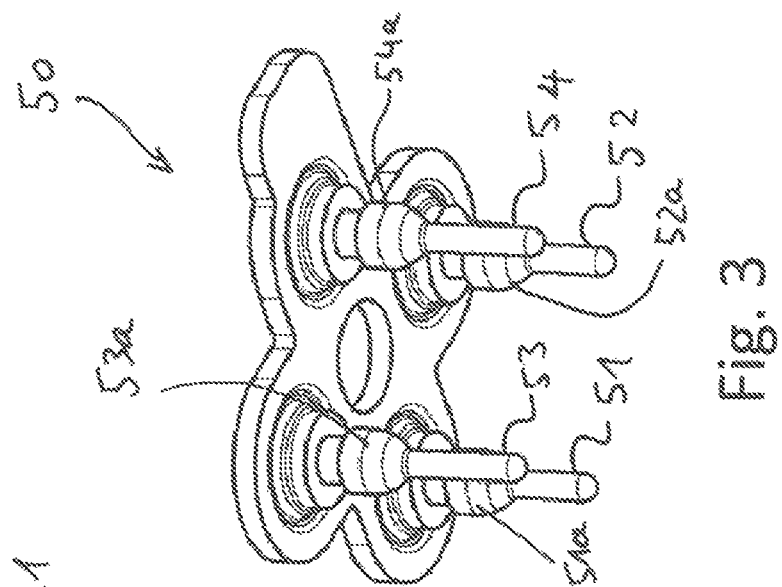
FIG. 3 shows an exemplary sealing device according to the invention in a perspective view.
Figure 2:
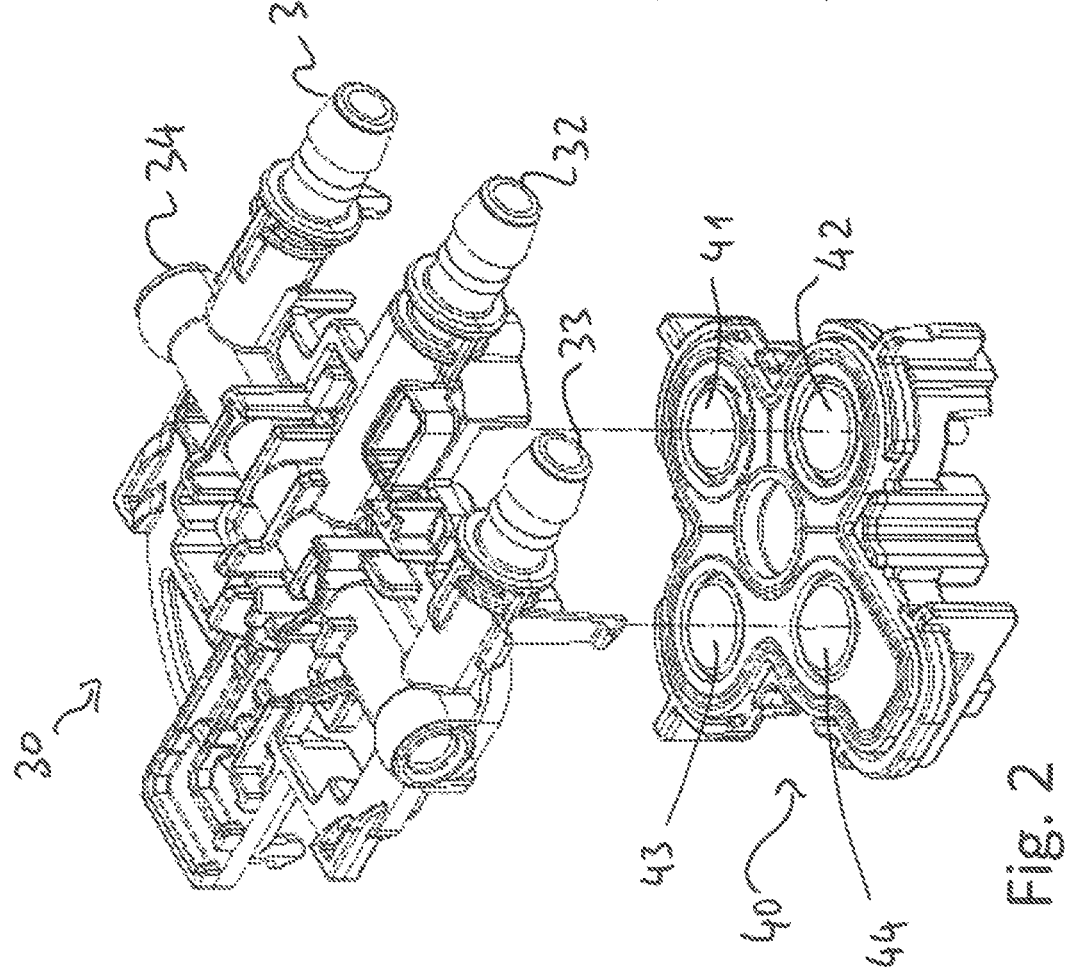
FIG. 2 shows an exploded view of two components of the switch arrangement according to the invention from FIG. 1.

FIGS. 2 and 3 show the interior of the housing 80 shown in FIG. 1. A first component 30 contains the outlets 31, 32 and 33 as well as a common pressure line from which the outlets branch off. The common pressure line 34 is connected at a suitable point to the pressure source (not shown here).

This first component 30 is connected to a second component 40. The second component 40 has a plurality of receptacles 41-44. These serve to accommodate the seal arrangement 50 according to the invention, shown in FIG. 3. Projections 51-54 are provided on the seal arrangement and dip into the corresponding receptacles 41-44. The elongate ends of the projections 51-54 are preferably guided in the housing (not shown here) in corresponding receptacles (see FIG. 4A, reference signs 83 and 84). The projections 51-54 furthermore have widened portions 51a-54a, which serve to be pulled along by a corresponding movable component mounted displaceably on the component 40. In accordance with the invention, the seal arrangement 50 is preferably formed with its projections 51-54 on a one-piece component made of an elastomer material. This may significantly reduce the required number of components.

The operating principle of the seal arrangement will be explained in greater detail hereinafter with reference to FIGS. 4A and 4B.

FIG. 4A shows a first unactuated state of the switch arrangement 1 according to the invention. The cover 2, which rests on corresponding actuation elements 63, 64 of the actuation device, can be seen. Furthermore, the first component 30 and the second component 40 can be seen in section. The two components 30 and 40 are connected to each other; in the example shown they are screwed to each other by a screw 3. In this sectional view, one of the outlets 33 is shown by way of example. This is fed from the common fluid line (not shown here), provided the corresponding region 24 is pressed by the user.

In this case, the following happens: If the portion 24 is pressed down against the z-direction, the actuation element 64 coupled to it is also moved against the z-direction. The actuation element 64 is in turn coupled to an actuation portion 44a mounted on the second component 40. If the actuation element 64 moves downwards in the drawing by being pressed, the same applies to the actuation portion 44a. The actuation portion 44a has an engagement projection 44b which engages in a tapered region of the projection 54 above the widened portion 54a. Furthermore, the actuation portion 44a is formed with a substantially cylindrical region, in the interior of which a compression spring 4 is provided, which is supported on the inner wall of the housing 80.

If the actuation portion 44a is then moved against the z-direction by actuation of the switch 24 and of the actuation element 64, it moves downwards against the preload of the compression spring 4 in the drawing. In so doing, the lower portion of the projection 54 dips further into the receptacle 84 provided on the housing 80. At the same time, the projection 54 is pulled along in the same direction, that is to say perpendicularly away from the sealing surface of the first component 30, against the z-direction, due to the coupling in the region 44b. As can be seen in FIG. 4B, this creates a space or gap S that allows a flow from the common fluid line (not shown) through the gap S into the outlet 33, thus opening a flow path. The targeted downward pull of the projection 54 opens the gap S equally across the sealing area and thus represents a defined opening of the outlet 33. This prevents an uncontrolled tilting of the sealing device 50 by an additional pulling or pushing of the sealing device 50 in the plane x-y perpendicular to the actual direction of movement z. The gap S is opened without any tilting producing an undefined opening state. Similarly, this also applies accordingly to all other switches 21-23 with respect to the projections 51-53. If the pressure on the switch decreases, the springs 4 ensure that the corresponding projections of the sealing device are again pressed in the z-direction, i.e. upwards, and close the flow path.

In the region 70 (FIG. 4B), electrical contact is also made when one of the switches 21-24 of the switch arrangement 1 is pressed.

This will now be explained with reference to FIGS. 5-7.

FIGS. 5 and 6 illustrate the electrical contact in principle. Since the switch according to the invention must also close an electric circuit when actuated, the actuation device 60 must also open an electrical current path at the same time as the pneumatic flow path. A conductor portion 71, 72, 73, 77 is provided for this purpose, which leads to a corresponding voltage source or an electrical consumer. In the region 77 there is a contact point provided, which is contacted by a corresponding contact element 76 when the actuation device 60 is actuated. The electric circuit is closed in this way. This is shown in FIG. 6. When the component 64 is pressed, the actuation portion 44a on the lower component 40 is moved over the portion 64a, and the seal is moved in the region of the projection 54 of the sealing device 50. An energized portion 74, with the contact element 76 at its end, is pushed down over an actuation projection 64b when the switch arrangement is actuated and thus comes into contact with the region 77, thus closing the circuit and supplying power to the pressure source. At the same time, an optionally provided, upwardly convexly curved leaf spring portion 75 is pressed down in the region of its curvature. In so doing, the curvature is flattened and abruptly changes into a concave curvature as the pressing process continues, resulting in an acoustic clicking noise audible for the user. The concave state of the portion 75 is metastable, so that this automatically returns to the initial position shown in FIG. 6 when the pressure on the switch is released.

If a flow path is opened, it is theoretically possible to perform both a filling and an emptying of a bladder connected to the switch arrangement according to the invention. Consequently, a switch must be provided which is capable of selectively emptying a bladder. To this end, a further current path (negative pole) must be created, which generally reverses the pump or the pressure source or switches a drain valve (not shown here). An exemplary arrangement is shown in FIG. 7. The first current path 71, 72, 73, 77 has already been described in conjunction with FIG. 5. A corresponding actuation element 61, which can be actuated, for example, by the portion 21 in FIG. 1, is connected to a contact 78. If the component 61 is pressed, the contact 78 moves towards the component 77a of a further current path 71a, 72a. When the other switches are actuated, the power supply to the pressure source via the component 74 is carried out as described above, such that the first current path (positive pole) is opened. In this way it is possible, for example, to reverse the polarity of a pump as pressure source and switch easily from pressure mode (filling a bladder) to suction mode (emptying a bladder). For emptying, it is preferable to connect appropriate drain valves via this second current path, which allow the fluid to escape easily from the system.

The present invention provides a particularly functionally reliable and compact electropneumatic circuit arrangement which, on the one hand, manages with relatively few components and, on the other hand, is also capable of indicating the actuation process acoustically.

The invention claimed is:

1. An electropneumatic switch arrangement (1) comprising an actuation device (2, 21, 22, 23, 24, 60, 61, 64), a plurality of pneumatic outlets (31, 32, 33) for connection to fluid-fillable devices, and a pneumatic supply connection (34) for connection to a pressure source, the actuation device (2, 21, 22, 23, 24, 60, 61, 64) being connected to a sealing device (50), the actuation device (2, 21, 22, 23, 24, 60, 61, 64) being designed in such a way that, when the actuation device (2, 21, 22, 23, 24, 60, 61, 64) is actuated, the actuation device (2, 21, 22, 23, 24, 60, 61, 64) opens a predefined flow path between the supply connection (34) and at least one of the outlets (31, 32, 33) and, in doing so, closes a current path for actuating the pressure source,
wherein the sealing device (50) is mechanically coupled to the actuation device (2, 21, 22, 23, 24, 60, 61, 64) in such a way that at least a part of the sealing device (50) is moved, in particular displaced, by the actuation device (2, 21, 22, 23, 24, 60, 61, 64) when the actuation device (2, 21, 22, 23, 24, 60, 61, 64) is actuated, thereby opening a flow path between the supply connection (34) and at least one of the outlets (31, 32, 33).

2. The electropneumatic switch arrangement (1) according to claim 1, wherein the electropneumatic switch arrangement comprises a first component (30) comprising the supply connection (34) and the outlets (31, 32, 33), and a second component (40) connected to the first component, the sealing device (50) being arranged between the first component and the second component.

3. The electropneumatic switch arrangement (1) according to claim 2, wherein the second component (40) has a plurality of receptacles (41, 42, 43, 44), and in that projections (51, 52, 53, 54) are provided on the sealing device (50), which dip into the corresponding receptacles (41, 42, 43, 44).

4. The electropneumatic switch arrangement (1) according to claim 1, wherein the sealing device (50) is a one-piece or one-part element, in particular made of an elastomer material.

5. The electropneumatic switch arrangement (1) according to claim 1 wherein the sealing device (50) comprises a plurality of projections (51-54) having coupling portions which are coupled to actuation portions (44a) coupled to the actuation device (2, 21, 22, 23, 24, 60, 61, 64), the actuation portions (44a) being formed such that at least one of the actuation portions (44a), when the actuation device (2, 21, 22, 23, 24, 60, 61, 64) is actuated, is/are moved, in particular pulled, into an open position which frees at least one flow path.

6. The electropneumatic switch arrangement (1) according to claim 1, further comprising a preloading device (4), in particular a compression spring, which preloads the sealing device into a closed position, in which the flow path is blocked.

7. The electropneumatic switch arrangement (1) according to 1, further comprising an acoustic signalling device (74, 75), which is designed to signal acoustically the actuation of the actuation device (2, 21, 22, 23, 24, 60, 61, 64).

8. The electropneumatic switch arrangement (1) according to claim 7, wherein the acoustic signalling device (74, 75) comprises a curved, in particular metallic, leaf spring element (75), which, when the actuation device (2, 21, 22, 23, 24, 60, 61, 64) is actuated, is pressed through in such a way that the curvature of the acoustic signalling device (74, 75) is inverted.

9. The electropneumatic switch arrangement (1) according to claim 1, wherein the actuation device (2, 21, 22, 23, 24, 60, 61, 64) comprises a plurality of actuation elements (61, 64), which are each associated with a flow path (31, 32, 33) and/or an electric contact element (78).

10. The electropneumatic switch arrangement (1) according to claim 9, wherein the actuation elements (61, 64) are arranged on a tilt element (60) mounted tiltably on the electropneumatic switch arrangement (1).

11. The electropneumatic switch arrangement (1) according to claim 10, wherein the tilting element (60) is preloaded into a non-actuation position, in which the flow in the switch arrangement is interrupted and/or no flow path is open.

12. The electropneumatic switch arrangement (1) according to claim 1, wherein electrical contact is made in a central region (70) of the actuation device (2, 21, 22, 23, 24, 60, 61, 64) when a switch (21, 22, 23, 24) of the electropneumatic switch arrangement (1) is pressed.

13. The electropneumatic switch arrangement (1) according to claim 12, wherein the electrical contact is made at a unit (71, 71a, 72, 72a, 73, 74, 76, 77, 77a, 78).

14. A motor vehicle interior arrangement, in particular a motor vehicle seat, having a plurality of fluid-fillable bladders and an electropneumatic switch arrangement (1), the electropneumatic switch arrangement (1) being connected to the fluid-fillable bladders via fluid lines.

15. The motor vehicle interior arrangement according to claim 14, wherein the pressure source is a pump electrically and fluidically connected to the electropneumatic switch arrangement (1), one of the actuation elements being designed to change the polarity of the pump in order to empty one or more of the bladders.

* * * * *